Jan. 2, 1962  R. U. GARRETT  3,015,268
LAMINATED PRINTING PLATE AND PROCESS FOR MAKING SAME
Filed April 4, 1958

INVENTOR.
RUSSELL U. GARRETT
BY
Woodhams Blanchard & Flynn
ATTORNEYS

United States Patent Office

3,015,268
Patented Jan. 2, 1962

3,015,268
LAMINATED PRINTING PLATE AND PROCESS
FOR MAKING SAME
Russell U. Garrett, R.R. 1, Box 644, Ross Township,
Kalamazoo County, Mich.
Filed Apr. 4, 1958, Ser. No. 726,537
3 Claims. (Cl. 101—401.1)

This invention relates in general to a printing plate for a printing press, said plate having a laminated structure including a sheet of fiberglass fabric impregnated with a heat activated, resinous adhesive, and said invention also relates to a method of making both said impregnated sheet and the printing plate.

In the fabrication and use of printing plates particularly for rotary printing presses, there are several problems which have persisted over a long period of time in spite of continuous and numerous attempts to overcome them. One such problem has been the reduction in the weight of such printing plates without adversely changing their strength and/or rigidity. Another problem concerns the tendency of the printing surface on existing curved plates to become distorted when the plates are being curved. It has been found that, by using certain types of laminated structures, these problems can be overcome. Usually, the laminated plate is comprised of an outer lamina, which may include an electrotype shell and a stiffening material, an inner lamina of backing material and an intermediate lamina, which serves to bond the inner and outer laminae together.

The laminated printing plates are strong and light in weight. The relatively thin outer lamina, including the printing surface, is easy to curve into the cylindrical shape required for a rotary printing press. Furthermore, because of the thinness of this outer lamina, the distortion in the printing surface during the bending operation is substantially eliminated, particularly by comparison with the distortion which occurs when a relatively thick printing plate is curved for the same purposes.

However, the forming of such laminations according to existing practices creates additional problems, and the laminated product resulting therefrom is difficult to make and not always satisfactory. For example, in bonding the laminae together, it is often difficult to maintain a uniform overall thickness in the completed printing plate and still maintain a firm and secure bond between the adjacent laminae. Furthermore, even minor errors in the thicknesses of the individual laminae, which would be negligible in themselves, may be cumulative and thus result in a completed plate of unacceptable, non-uniform thickness. It is well-known that such a plate produces blurs and voids on the sheet printed thereby. The intermediate lamina, which bonds the printing lamina to the backing lamina, has been the biggest source of trouble in maintaining a uniform thickness of the completed plate. Even though extreme care has been exercised in forming the intermediate lamina and bonding it to the other layers, the thickness problem has persisted.

It has been found that the thickness of fiberglass fabric can be maintained substantially constant and uniform. Moreover, the openings between the threads in said fabric, which is preferably woven, provide excellent anchor means for the resin adhesive combined therewith, thereby providing a strong bonding sheet of uniform thickness.

Accordingly, a primary object of this invention is the provision of a printing plate which is light in weight, which can be easily and accurately fabricated with a uniform thickness, which has a high resistance to distortion and disfiguration resulting from both rugged use and changes in atmospheric condition, which can be produced by persons acquainted with the procedures for making existing types of printing plates, and which has an intermediate or bonding lamina including a sheet of fiberglass fabric.

A further object of this invention is the provision of a method for making a laminated printing plate particularly for a rotary printing press including the preparation of an intermediate lamina in said plate comprised of a sheet of fiberglass fabric impregnated with a heat activated, adhesive material.

A further object of this invention is the provision of a method for preparing an intermediate bonding layer for a laminated printing plate adapted for use on a rotary type printing press, said intermediate lamina comprising a sheet of fiberglass fabric impregnated with a heat activated resin capable of adhering both to said fiberglass fabric and to the laminae adjacent to said intermediate lamina.

A further object of the invention is the provision of a printing plate, as aforesaid, having an electrotype printing surface.

Other objects of this invention will become apparent to persons familiar with this type of product and process upon reading the following specification and examining the accompanying drawings in which.

Figure 3:
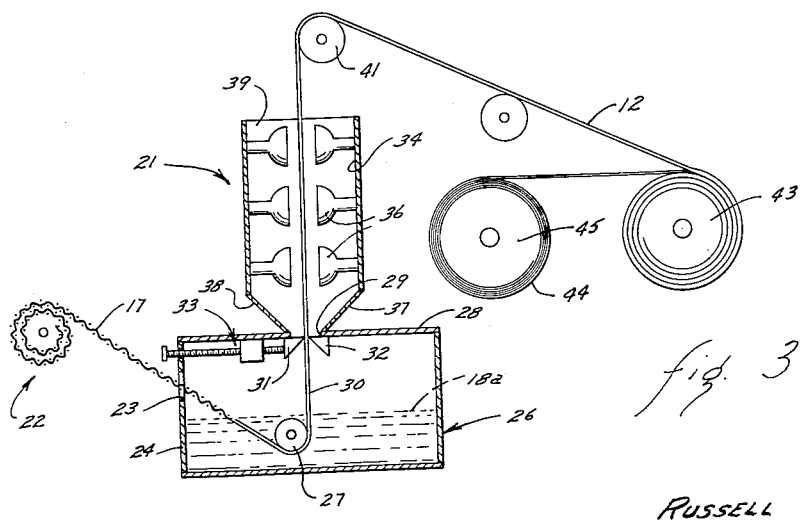
FIGURE 3 is a central cross-sectional view of an apparatus by means of which a sub-process of the invention may be carried out.

For convenience in description, the terms "upper," "lower" and derivatives thereof will have reference to the apparatus shown in FIGURE 3, which is in its normal position of use. The terms "inner," "outer" and derivatives thereof will have reference to the geometric center of said apparatus shown in FIGURE 3 as well as the geometric center of a printing plate for a rotary type printing press.

*General description*

In order to meet the objects of the invention, including those set forth above, there has been provided a laminated printing plate for a printing press comprised of an inner lamina, an intermediate lamina, and an outer lamina. The inner and outer laminae are relatively stiff by comparison with the intermediate lamina and, where the press is rotary, are preferably preshaped to the contour of the printing press cylinders. The outer lamina may be a single plastic sheet or a metallic electrotype shell filled with stiffening material in a substantially conventional manner. The intermediate lamina is preferably comprised of a porous sheet of fiberglass fabric impregnated by a heat activated resinous adhesive. The process of producing the resin impregnated, intermediate lamina may be performed by means such as the apparatus shown in FIGURE 3 which applies the resinous adhesive to a sheet of fiberglass fabric. The process of curving the inner and outer lamina, prior to assembly with the intermediate and inner laminae, and bonding the inner and outer laminae to said intermediate lamina may be performed by structures known to exist. Such a structure may, for example, be comprised of a pair of curved cooperating platens between which an individual lamina and/or a group of such laminae may be disposed, after which said platens are moved toward each other by any conventional means, such as pressure fluid operated mechanisms.

*Detailed construction*

Figure 1:
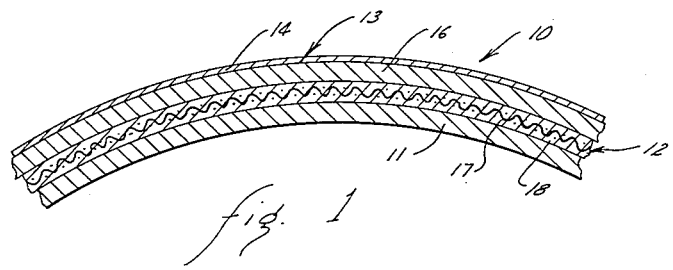
FIGURE 1 is a sectional view of a laminated printing plate for a rotary printing press taken transversely of the axis of curvature of the plate.

The laminated printing plate 10 (FIGURE 1), which has been selected for the purpose of illustrating the invention, is comprised of an inner lamina 11, an intermediate lamina 12, and an outer lamina 13, which laminae are bonded together in a manner set forth hereinafter. The plate 10 herein selected has an electrotype surface and is intended for use on a rotary press. However, it will be seen that at least some of the objects of the invention may be achieved where the printing plate is flat and/or it does not have an electrotype printing surface. The inner lamina 11, which constitutes a backing sheet for the completed electrotype plate, preferably consists of a sheet of metal, such as aluminum, which might be bent and permanently shaped by the same pressure required to effect a uniform bonding of said laminae during the final assembly of the electrotype plate. However, said inner lamina is generally relatively rigid and, therefore, requires pre-shaping to its final curvature before final assembly into said plate. As indicated above, such preshaping can be effected by many devices. The thickness of the inner lamina 11 is carefully controlled by conventional means when said lamina is formed.

The outer lamina 13 of the plate 10 is comprised in this embodiment of an electrotype shell or outer layer 14, which may be made from nickel and copper, for example, in a substantially conventional manner. Said outer lamina also includes an inner layer 16 of stiffening material, such as lead or a plastic material, which is secured to, and fills in the back of, the shell 14. The outer lamina 13 is made in the flat and its thickness is carefully controlled by controlling the thickness of the inner layer 16. It will be recognized that the outer lamina 13 may, under some circumstances, be fabricated from a plastic material in a single layer according to existing teachings. The outer lamina 13 is shaped to the desired curvature.

The intermediate lamina 12 advantageously consists of a sheet 17 of porous fiberglass fabric (FIGURE 1), which is impregnated with a heat activated adhesive, such as resin 18. The glass fabric 17 provides high tensile strength, resilient flexibility and an extremely accurate and uniform thickness. However, it will be recognized that other fabrics may be used in place of fiberglass, with results depending upon the similarity of their essential characteristics with those of fiberglass. The intermediate lamina 12 may be produced by means of the apparatus 21 shown schematically in FIGURE 3.

An elongated sheet of porous glass fabric 17 (FIGURE 3) is moved from the roll 22 through an opening 23 in the side wall 24 of the tank 26, which contains a supply of liquid resin 18a. The glass fabric sheet 17 passes under an axially horizontal roller 27 disposed within the tank 26 and immersed in said resin 18a, and the resin impregnates said fabric. The upper wall 28 of the tank 26 has a horizontally elongated opening 29 directly above, and parallel with, the axis of the roller 27 for reception of the fabric 17 with the resin 18a adhering thereto. A pair of dies 31 and 32 are mounted upon the upper wall 28 adjacent to the opening 29 therein for engaging the opposite sides of the resin impregnated sheet 30 passing through the opening 29. The adjustment mechanism 33 is provided for moving the die 31, in this particular embodiment, toward and away from the die 32 in order to control the thickness of the resin impregnated sheet 30 passing therebetween.

The resin impregnated sheet 30 of selected thickness then passes upwardly through the chamber 34 in which heating means, such as the lamps 36, are provided for congealing the liquid resin 18a upon the glass fabric 17. The heating chamber 34 has filtered inlet openings 37 and 38 at its lower end adjacent to the tank 26, and a discharge opening 39 through which the products of vaporization may escape. A roller 41 is mounted directly above the discharge opening 39 for engaging the resin impregnated sheet 30, from which the intermediate lamina 12 is cut, and guiding said sheet onto a takeup roller 43. If desirable, the sheet 30 may be combined on the roller 43 with an adjacent sheet 44 of backing material, which is supplied from a roll 45 adjacent to the take-up roller 43 and prevents successive layers of the sheet 30 from sticking together. Such backing material 44 is preferably removed when the sheet is bonded to the inner and outer laminae.

Figure 2:
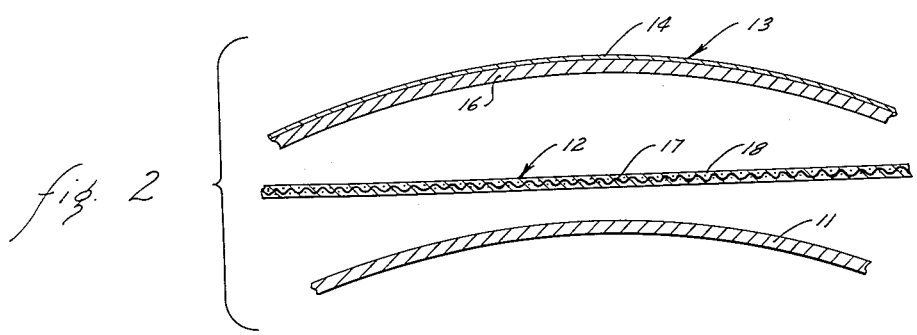
FIGURE 2 is an exploded view of said printing plate as it appears before the laminae are secured to each other.

The individual laminae 11, 12 and 13 are disposed, approximately as shown in FIGURE 2, in a suitable machine for effecting the final shaping and bonding together of the laminae to form the laminated plate 10. Such machines are known to the art and hence need no detailing here. Briefly, however, pressure is applied by a suitably shaped press to the remote surfaces of the inner and outer laminae, 11 and 13, respectively, and heat is applied to one or both surfaces, thereby activating the resin 18 in the intermediate lamina 12. The temperature is controlled so that the resin 18 is bonded to the adjacent surfaces of the inner and outer laminae, thereby securing said inner and outer lamina with respect to each other as well as with respect to the fiberglass fabric within the intermediate lamina. The laminated plate is allowed to cool, after which it is subjected to final processing, such as routing and beveling, and is inspected.

The fiberglass within the intermediate lamina 12 provides a firm base of uniform thickness which positively and accurately positions the adjacent surfaces of the inner and outer laminae when they are pressed toward each other during the bonding operation, during which the resin 18 is soft and pliable. After the resin has cooled and solidified, the fiberglass tends to resist any stretching or similar distortion or change in the intermediate lamina 12, as well as the inner and outer laminae bonded thereto, thereby preserving the desired shape of the preshaped inner and outer laminae and the uniform thickness of the plate 10.

Although a particular preferred embodiment of the invention has been disclosed hereinabove for illustrative purposes, it will be understood that variations or modifications of such disclosure, which lie within the scope of the appended claims, are fully contemplated.

I claim:

1. A laminated printing plate for a printing press, comprising: an outer lamina of uniform thickness including an outer, printing layer and a layer of stiffening material secured to the inner surface of said printing layer; an inner lamina of uniform thickness spaced from said outer lamina; and a substantially noncompressible intermediate lamina of uniform thickness, said intermediate lamina including a layer of porous fabric impregnated with, and imbedded in, a heat activated resinous adhesive, said fabric being freely permeable to said adhesive so that said adhesive extends on either side of and through said fabric, the threads of said fabric extending into close proximity to the opposing surfaces of said inner and outer laminae, said adhesive being adhered to said opposing surfaces by a heat and pressure generated bond whereby said fabric and said inner and outer laminae are secured with respect to each other, and said plate is of uniform thickness.

2. A printing plate for a rotary printing press, comprising: an outer lamina of uniform thickness curved partially around a single axis, said outer lamina including a radially inner layer of stiffening material secured to, and covered by, a radially outer layer of printing means; an arcuate inner lamina of uniform thickness curved around said axis and having a radius of curvature slightly less than the radius of curvature of the outer lamina; a substantially noncompressible, flexible intermediate lamina of uniform thickness curved about said axis and including a sheet of fiberglass fabric impregnated with, and imbedded in, a heat activated resinous adhesive, said fabric being freely permeable to said adhesive so that said adhesive extends on either side of and through said fabric, and threads of said fabric extending into close proximity to the opposing surfaces of said inner and outer laminae, said adhesive being adhered to said opposing surfaces by a heat and pressure generated bond whereby said glass fabric and said inner and outer laminae are securely held with respect to each other, and said plate is of uniform thickness.

3. In a method of making a printing plate for a rotary printing press, the steps including: moving an elongated web of woven fiberglass through a liquid bath of heat activated resinous adhesive within a substantially closed container so that said bath of resinous adhesive is substantially isolated from ambient atmosphere and so that said fiberglass web is adhered to and is impregnated with said adhesive, at least the final portion of the travel of said web through said bath being upwardly directed; moving said adhesive impregnated web substantially vertically between a pair of carefully spaced dies to remove excess adhesive from said impregnated fabric so that said impregnated web is of accurately uniform thickness throughout its length; applying heat to the adhesive impregnated fabric as it moves upwardly immediately after it exits from the dies and thereby solidifying said adhesive; placing a sheet of uniform thickness of said adhesive impregnated fiberglass between the opposing surfaces of correspondingly curved, partially cylindrical, laminae of uniform thickness, the outer laminae having printing means on its remote surface; applying pressure to cause said laminae to move toward each other to the extent permitted by said sheet without changing the curvature of said laminae and simultaneously applying heat to activate said adhesive so that it adheres to said opposing surfaces, said adhesive being free to travel through said fabric; and cooling the adhesive to thereby form a printing plate of uniform thickness.

References Cited in the file of this patent

UNITED STATES PATENTS

| | | |
|---|---|---|
| 1,378,573 | Taylor | May 17, 1921 |
| 1,676,362 | Seidell et al. | July 10, 1928 |
| 1,762,336 | Kirschbraun | June 30, 1930 |
| 2,028,712 | Swan et al. | Jan. 21, 1936 |
| 2,114,288 | Davis | Apr. 19, 1938 |
| 2,438,195 | Tierney | Mar. 23, 1948 |
| 2,444,830 | Kellgren et al. | July 6, 1948 |
| 2,491,409 | Kropa et al. | Dec. 13, 1949 |
| 2,542,064 | Tilden | Feb. 20, 1951 |
| 2,558,269 | Reilly | June 26, 1951 |
| 2,607,709 | Simpson et al. | Aug. 19, 1952 |
| 2,608,499 | Straka | Aug. 26, 1952 |
| 2,800,856 | Myers | July 30, 1957 |

FOREIGN PATENTS

| | | |
|---|---|---|
| 387,926 | Great Britain | Feb. 16, 1933 |

OTHER REFERENCES

Swayze: Photo-Engraving Being Done on Magnesium. Photo-Engravers Bulletin, Nov. 1947, pages 154–162. Only page 158 made of record.